United States Patent [19]
Hofer

[11] 3,901,955
[45] Aug. 26, 1975

[54] REACTION PRODUCTS OF PHENOLS WITH PHOSPHOROUS TRICHLORIDES

[75] Inventor: Kurt Hofer, Munchenstein, Switzerland

[73] Assignee: Sandoz Ltd., Basel, Switzerland

[22] Filed: Dec. 15, 1972

[21] Appl. No.: 315,452

Related U.S. Application Data

[63] Continuation-in-part of Ser. No. 851,721, Aug. 20, 1969, Pat. No. 3,707,565.

[30] Foreign Application Priority Data

Aug. 28, 1968 Switzerland.................. 12899/68

[52] U.S. Cl........... 260/927 R; 260/45.95; 260/928; 260/930; 260/937; 260/953; 260/973; 260/976
[51] Int. Cl.²......................................... C07F 9/08
[58] Field of Search......... 260/953, 927 R, 973, 976

[56] References Cited
UNITED STATES PATENTS

| | | | |
|---|---|---|---|
| 3,112,286 | 11/1963 | Morris et al. .................... | 260/953 X |
| 3,386,952 | 6/1968 | Gleim et al. ..................... | 260/953 X |
| 3,467,737 | 9/1969 | Brindell ............................. | 260/953 |
| 3,467,755 | 9/1969 | Hunter............................... | 260/953 |

*Primary Examiner*—Richard L. Raymond
*Attorney, Agent, or Firm*—Gerald D. Sharkin; Richard E. Vila; Joseph J. Borovian

[57] ABSTRACT

Novel phenols obtained by reacting a compound of the formula I

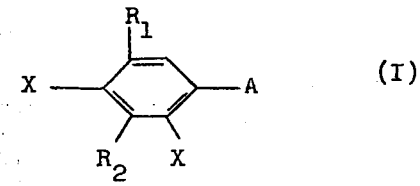

in which
one X is a hydroxyl group and the other X is selected from hydrogen atoms and tertiary butyl radicals,
each of $R_1$ and $R_2$ is independently selected from hydrogen atoms and tertiary butyl radicals,
A is selected from phenyl radicals and phenyl radicals substituted by up to 2 tertiary butyl radicals, with the proviso that at least one of $R_1$ and $R_2$ must be a tertiary butyl radical and with the further proviso that at most 3 tertiary butyl radicals may be present per molecule, with phosphorus trichloride and chlorine atoms which may be left on the phosphorus atom are then reacted with water, alcohols, polyalcohols, or phenols, are described and their use as stabilizers against certain deterioration phenomena, especially adverse effect of light, heat or oxidation with organic materials, especially plastics such as polypropylene.

10 Claims, No Drawings

REACTION PRODUCTS OF PHENOLS WITH PHOSPHOROUS TRICHLORIDES

This application is a Continuation-in-Part of application Ser. No. 851,721, filed Aug. 20, 1969 now U.S. Pat. No. 3,707,565.

The present invention relates to novel phenol derivatives, a process for their production and their use as stabilizers for plastics or other organic materials against certain deterioration phenomena on exposure to heat or oxygen or sometimes even light.

Many phenols and phenol derivatives have previously been proposed for use as stabilizers for organic materials, especially plastics against heat or oxidation deterioration, partly also against deterioration caused by light. Of these materials those of especial technical significance are (i) sterically hindered phenols, for example:

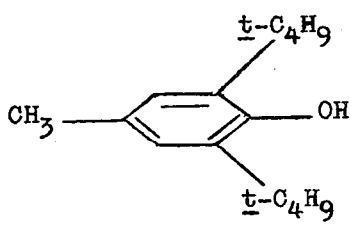

(ii) bisphenols, for example:

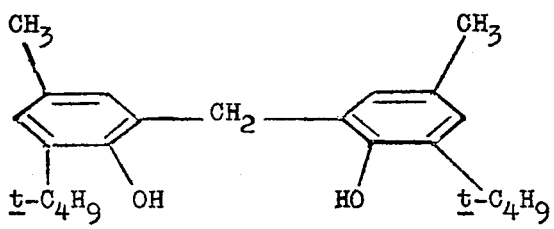

and (iii) sulphur containing phenols, for example:

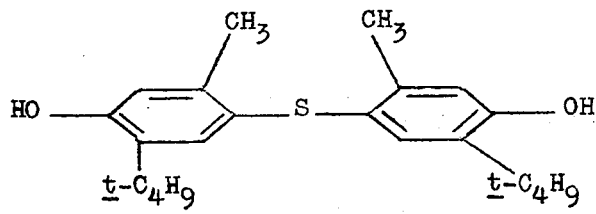

It has likewise been proposed previously to use butylated phenyl phenols and products obtained by linking two molecules of p-hydroxydiphenyl by means of agents having a condensing effect (e.g. sulphur chloride or an aldehyde), in order to stabilize polyolefins.

It is known that the nature of the substitution of the phenols is of the greatest importance for the effectiveness of these substances as stabilizers. The presence of a bulky alkyl residue, especially the tert.-butyl residue in the o-position to the phenolic OH-group, has shown itself to be particularly favourable. When such groups are absent, the effectiveness is appreciably lower and, furthermore, discolouration of substrates containing such phenols occurs. As a result, it has been established that only highly uniform and defined compounds are suitable for use as stabilizers and for that reason the manufacture of such compounds tends to be expensive.

It has now been found that especially good stabilizing effects are obtained when there are used as stabilizers for plastics compounds which have been obtained by the condensation of two or more molecules of a hydroxydiphenyl containing at least one tertiary butyl residue situated in the ortho-position to the hydroxyl group by means of a di- or polyfunctional agent.

The present invention provides a process for the production of phenol derivatives, which is characterized in that a compound of the formula

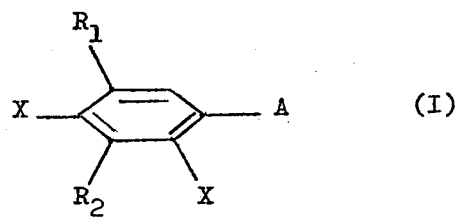

in which
one X is a hydroxyl group and the other X is selected from hydrogen atoms and tertiary butyl radicals,
each of $R_1$ and $R_2$ is independently selected from hydrogen atoms and tertiary butyl radicals,
A is selected from phenyl radicals and phenyl radicals substituted by up to 2 tertiary butyl radicals,
with the proviso that at least one of $R_1$ and $R_2$ must be a tertiary butyl radical and with the further proviso that at most 3 tertiary butyl radicals may be present per molecule, is reacted with phosphorus trichloride.
and chlorine atoms which may be left on the phosphorus atom are then reacted with water, alcohols, polyalcohols or phenols.

By carrying out the above process there are obtained new compounds; these form part of the present invention and have the formula

(II)

wherein

B is a residue of a compound of the formula I linked to phosphorus through oxygen or directly at the aromatic nucleus m is zero, 1 or 2 each of $R_3$ is independently selected from hydrogen atoms, alkyl radicals with 1 to 18 carbon atoms, cyclohexyl- or methylcyclohexyl radicals, hydroxyalkyl radicals with 2 to 6 carbon atoms, alkylene radicals derived from polyfunctional alcohols with 2 to 6 carbon atoms, phenyl radicals, $C_{1-18}$-alkyl-phenyl radicals, hydroxyphenyl or phenylene radicals derived from resorcinol, hydroxyphenyl or phenylene radicals derived from hydroquinone, hydroxydiphenyl radicals, hydroxydiphenylpropane radicals and radicals derived from 4,4'-dihydroxydiphenyl and 4,4'-dihydroxydiphenylpropane, with the proviso that, when $R_3$ is a divalent residue, it is linked to one or to two residues of formula II e.g.

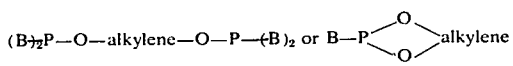

The compounds of the formula II, where B is linked to phosphorous through oxygen may be prepared for example by reacting 1 mol of a compound of the formula I with approximately 0.33 mols of phosphorus trichloride at a temperature of 140° to 200°C, whereby HCl-gas is evolved. A solvent may be present, such as toluene, xylene, petroleum fractions with a boiling range of 100° to 180°C, ethylene chloride or chlorobenzene. The solvent may be distilled off during the reaction or afterwards, preferably under vacuum. It is also possible to carry out the reaction at lower temperature, e.g. 0° to 100°C. Under these conditions at least 1 mol of a tertiary amine such as pyridine or triethylamine must be used.

When the compound of formula I is heated with more than 0.33 mols of PCl 3, e.g. 0.4–1 mol, temperatures from 40° to 100°C are used with advantage and, if desirable, a solvent such as toluene, xylene, hexane, cyclohexane, petroleum fractions with a boiling range of 70° to 180°C, carbon tetrachloride, ethylene, chloride, tetrachloroethane or chlorobenzene may be present. The HCl formed may be driven off with an inert gas such as nitrogen or by applying vacuum, or alternatively a tertiary amine may be used.

The chlorine atom bound to phosphorus which are left after the reaction may be reacted with water at a temperature of 0° to 100°C, to form OH-groups or their salts, preferably in the presence of compounds showing alkaline reaction in water such as the hydroxides of sodium or potassium or calcium, sodiumcarbonate, sodium bicarbonate or sodium acetate, potassiumcarbonate, ammonia in the gaseous or dissolved form, pyridine, triethylamine or other tertiary amines. If the chlorine atoms are reacted with phenols, temperatures of 140° to 200°C are used, while if tertiary amines are present, temperatures of 0° to 100°C are employed. Here essentially the same conditions are used as described above for the reaction between compounds of the formula I and $PCl_3$. If the remaining chlorine atoms are reacted with an alkanol, cycloalkanol, cycloalkylalkanol or an arylalkanol, temperatures of 0°–100°C, preferably 50°–90°C, and essentially the same reaction conditions are applied as described above for the reaction between chlorine atoms bound to phosphorus and water. A solvent may be present such as $CCl_4$, ethylene chloride, hexane, cyclohexane, toluene, xylene, petroleum fractions boiling at 70° to 180°C, ether or chlorobenzene.

Compounds of formula I in which the residue B is linked directly to phosphorus are prepared under the known conditions for carrying out Friedel-Crafts reactions. For example, compounds of formula I are dissolved in a solvent such as carbontetrachloride, chlorobenzene, nitrobenzene, ethylene chloride or tetrachloroethane at a temperature of 20° to 20°C. The catalyst such as $AlCl_3$, $SuCl_4$, $ZnCl_2$, $BF_3$ or the etheral complex e.g. with ether or dioxane is added. $PCl_3$ is added at the same temperature. Subsequently to this Friedel-Crafts reaction, the chlorine atoms remaining on the phosphorus are reacted with phenols, water, alkanols, cycloalkanols, cycloalkylalkanols or arylalkanols as described above.

As mentioned the chlorine atoms in the reaction product may be replaced also with alkoxy-, cycloalkoxy, or aryloxy groups by treating those reaction products containing labile chlorine atoms with an alcohol or phenol (for example an alkanol containing 1–18 carbon atoms, cyclohexyl- or methylcyclohexyl alcohol, a glycol containing 2–6 carbon atoms in the molecule, glycerine, pentaerithrytol, phenol or a $C_{1-18}$-alkyl phenol, resorcinol, hydroquinone, 4,4'-dihydroxydiphenyl or 4,4'-dihydroxydiphenyl propane) Suitably the polyfunctional agent is used in an amount of from 0.5–1 mol for every mol of the compound of the formula I. Examples of reaction products of the formula II are

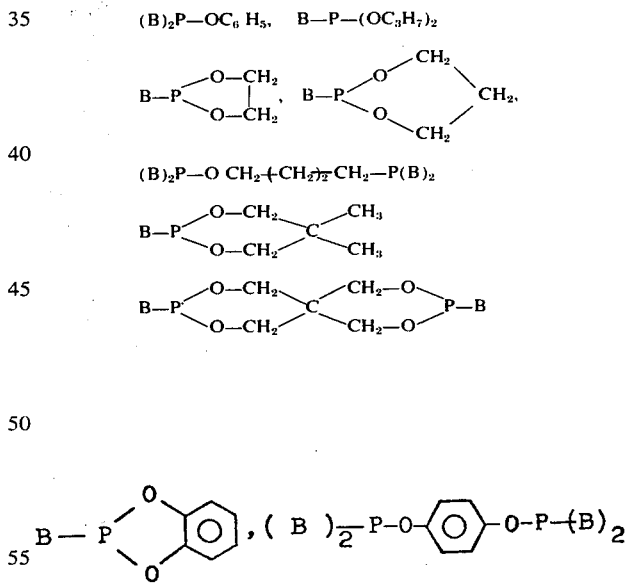

It is possible to use under the reaction conditions described above more than one polyfunctional compound, e.g. $PCl_3$ and sulphur chloride, in any desired sequence. A synergic effect may be obtained. Such compounds of formula II can be obtained e.g. when phosphorus is bound directly to the aromatic nucleus whilst the phenolic group has undergone reaction with the sulfur chloride. On the other hand it is possible to use e.g. a polyalcohol and to obtain compounds of the formula II wherein $R_3$ is linked to compounds of formula I which have been condensed with a sulphur chloride, e.g. $S_2Cl_2$.

The compounds of the formula I may be obtained from 2- or 4-hydroxydiphenyl by the addition of 1–3 mol of isobutylene or by reaction thereof with an iso- or tertiary-butyl halide or an iso- or tertiary-butyl alcohol in the presence of a catalyst, whereby mixtures of isomers result containing 1–3 tertiary-butyl residues; these may be used directly for the production of the compounds of the formula II. When the starting material is 1 mol of 2-hydroxydiphenyl to which 1–3 mol of isobutylene have been added isomer mixtures of the formula II which have been obtained in this way contain, as has been ascertained by investigation with the aid of gas chromotography or infrared or nuclear resonance spectroscopy, the following compounds

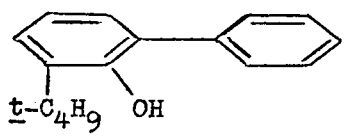 and

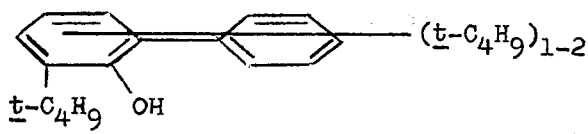

These two compounds together amount to at least 90% of the resulting product.

When the starting material is 1 mol of 4-hydroxydiphenyl and 1–3 mol isobutylene, an isomer mixture results containing 80 to over 90% of compounds of the formulae:

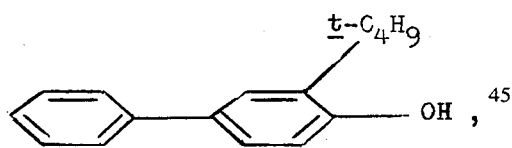,

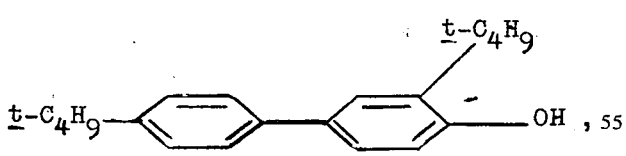,

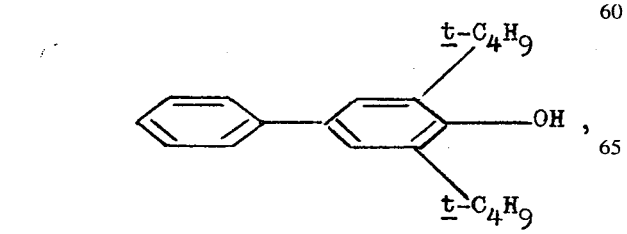,

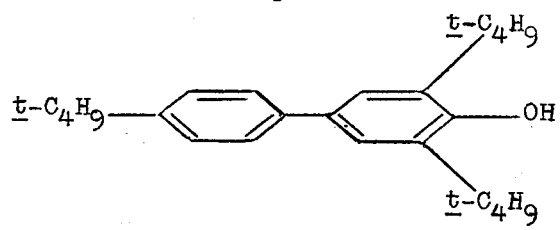

and additionally only a little (about 5–15%) of the compound of the formula

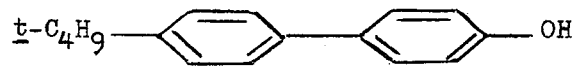

These isomer mixtures are usually obtained as highly viscous, practically odourless liquids which may be converted in the manner described to isomer mixtures of the compounds of the formula II by condensation.

The condensation products according to the invention may be worked into plastics in the usual way, for example by mixing with the molten or dissolved plastics. They have been found especially suitable for stabilizing polyolefins, for example polyethylene and polypropylene with which they do not only have an excellent stabilizing effect as regards the effect of heat, oxidation and to some degree also of light, but they are also characterized by a low degree of evaporation and migration when incorporated therein.

The compounds according to the invention may be used, however, likewise with success for stabilizing other plastics. They may be added to the materials to be protected or stabilized in amounts of from 0.05 to 2%.

In the following Examples the temperatures are stated in degrees Centigrade, "λmax." signifies the wave length, which is adsorbed most strongly; this wave length is given in nm (nanometer = $10^{-9}$m).

BUTYLATION OF HYDROXYDIPHENYLS

Example a

After the addition of 0.08 mol of aluminium chloride to 1 mol of 2-hydroxydiphenyl, 2.5 mol of isobutylene are introduced, while stirring well at 100–110° during 2½ hours. Stirring is continued for 1 hour at 100°, cooling is effected and the reaction produce it run into iced water containing a little hydrochloric acid. Separation is effected, the oily layer is washed with water, and water and a small amount of polymerized isobutylene are removed by heating in a vacuum to 150°. The residue is constituted by a brownish, thickly liquid, practically odourless oil which contains about 2.3 mol of isobutylene per mol of 2-hydroxydiphenyl. λmax: 286–289 nm (in hexane), E=5500.

Practically the same product is obtained when adding dropwise, instead of isobutylene, the corresponding amount of tert.-butylchloride.

Example b 1 mol of 2-hydroxydiphenyl is melted at about 75°, 0.015 mol of ethereal boron fluoride is added and then, while stirring well, 2 mol of isobutylene are introduced during about 2 hours. The temperature is maintained during 1 hour at 75°, 0.05 mol of potassium carbonate in the form of a 10% aqueous solution is added and stirring for 10 minutes is effected. Thereafter the aqueous solution is separated off and the oil is again washed with water at 70°. Subsequently dehydration in a vacuum at 150° is effected, a little polymerized isobutylene being distilled off simultaneously. A residue is obtained in the form of a pale brownish, thickly liquid oil which contains about 1.75 mol isobutylene per mol 2-hydroxydiphenyl. λmax.: 286–289 nm (in hexane), E = 5500.

Example c

After the addition of 5 cc ethereal boron fluoride to the solution of 170 g 4-hydroxydiphenyl in 350 g chlorobenzene, there is introduced, while stirring well, at 95°–100° and, during 1½ hours, 90 g of isobutylene. Stirring is continued for 1 hour at 95°, the solution is washed with 10 g of potassium carbonate in 250 cc water and the chlorobenzene and polymerized isobutylene are removed by water vapour distillation. After drying, the resulting residue (243 g) is constituted by a soft, crystalline mass. Based on the increase in weight it is possible to calculate that about 1.3 mol isobutylene per mol 4-hydroxydiphenyl have reacted.

By gas chromatography the following composition was established:
  about 5% 4-hydroxydiphenyl
  about 43% 3-tert.-butyl-4-hydroxydiphenyl
  about 43% highly butylated 4-hydroxydiphenyls with a tert.-butyl group in the 3-position
  and about 9% 4'-tert.-butyl-4-hydroxydiphenyl.

Example d 10 cc ethereal boron fluoride are added while stirring to 340 g 4-hydroxydiphenyl and 600 g ethylene chloride. At 80°–85° during 2 hours 270 g isobutylene are introduced and reaction is allowed to continue for a further hour at the same temperature. Subsequently 200 cc of a 10% potassium carbonate solution are stirred in, separation is effected and washing with water is again effected. Subsequently ethylene chloride, water and polymerized isobutylene are distilled off in a vacuum, the temperature being raised up to 160°. The residue is constituted by 562 g of a clear, brownish, tough liquid mass which is odourless. λmax.: 268–276 nm (in ethanol), E = about 18,400.

The composition determined by means of gas chromatography is as follows:
  about 1% 4-hydroxydiphenyl
  about 32% 3-tert.-butyl-4-hydroxydiphenyl
  about 57% highly butylated 4-hydroxydiphenyls with a tert.-butyl group in the 3-position
  and about 10% 4-tert.-butyl-4-hydroxydiphenyl.
From the weight increase it is possible to calculate an uptake of 2 mol isobutylene per mol 4-hydroxydiphenyl.

Example e

After the addition of 10 cc ethereal boron fluoride to 340 g 4-hydroxydiphenyl (2 mol) dissolved in 600 g carbon tetrachloride, 370 g isobutylene (6.6 mol) are introduced at 60°–65° while stirring well; the addition lasts about 2 hours with further reaction for 1 hour. After working up as described in Example d, 666 g of a brownish, thick liquid oil are obtained; $D_4^{20}$ = 0.959 g/cc, λmax.: 267–271 nm, E = about 17,200; gas chromatography shows the following approximate composition:
  about 1% 4-hydroxydiphenyl
  about 24% 3-tert.-butyl-4-hydroxydiphenyl
  about 67% of highly butylated 4-hydroxydiphenyls with a tert.-butyl group in the 3-position,
  and about 8% 4'-tert.-butyl-4-hydroxydiphenyl.
A content of 2.9 mol isobutylene per mol 4-hydroxydiphenyl was calculated.

Practically the same product is obtained when 5 g of boron fluoride are used as catalyst instead of the 10 cc ethereal boron fluoride.

EXAMPLE 1

15 g of phosphorus trichloride are added dropwise while stirring well at about 85° to a mixture of 60 g of butylated 2-hydroxydiphenyl obtained according to Example b, 150 g 1,2-dichloroethane and 30 g sodium carbonate; stirring for 3 hours at 85° is effected. 15 g of n-butanol are then added and heating to 85° is effected for a further 2 hours. The reaction product is washed well with water, and solvent and excess butanol are taken off in a vacuum at 100°. 68 g of a weakly yellow liquid are obtained, $D_4^{20}$ = 1.007 g/cc (phosphorus content: 2.6%). It is easily soluble in the usual organic solvents, λmax.: 289–293 nm (in alcohol).

By replacing the butanol with another alcohol, e.g. methanol, ethanol, propanols, isobutanol, amyl-, hexyl- and octylalcohols, products are obtained which are likewise liquid and of which λmax. is around 289–293 nm. When using polyalcohols, e.g. ethyleneglycol, diethyleneglycol, propyleneglycol, butyleneglycol, hexyleneglycol, glycerine, pentaerythritol, similar products are obtained which, however, are more viscous.

EXAMPLE 2

30 g of phosphorus trichloride are slowly added dropwise, while stirring, at 80°–85° to a solution of 68 g of butylated hydroxydiphenyl obtained according to Example e in 150 g 1,2-dichloroethane; stirring at 85° is effected for 3 hours. Thereafter 30 g n-butanol and 30 g sodium carbonate are added slowly and stirring for 3 hours at 85° is effected. After washing out with water, the solvent is distilled off in a vacuum and about 80 g of a thickly liquid, yellowish liquid result (phosphorus content: 3.2%). λmax.: 262–270 nm (alcohol).

As in Example 1 it is likewise possible in this case to use, instead of butanol, another alcohol, a glycol or a phenol (e.g. 4-tert.-butylphenol or 2,4-ditert.-butylphenol).

EXAMPLE 3

60 g of butylated 4-hydroxydiphenyl obtained according to Example c are dissolved in 150 g carbon tetrachloride and cooling to −10° is effected. 5 cc ethereal boron trifluoride are added and 15 g phosphorus trichloride are added dropwise while stirring during 1 hour. Stirring is effected at −10° for 1 hour, at 0° for 1 hour and at 50° for 2 hours. Subsequently 50 g ethanol are added and stirring at 50° for 1 hour is effected. The resulting solution is washed with water and 10% potassium carbonate solution, and solvent is removed by distillation in a vacuum. 70 g of a thickly liquid yellowish product result (phosphorus content: 3.0%). λmax.: 265–270 nm (in alcohol).

From the infrared spectrum it is seen that in this case the sterically hindered phenolic OH-groups are still present (sharp bands at 275μ). For this reason it is likely that a direct linkage between the diphenyl nucleus and the phosphorus has been mainly formed. In contradistinction thereto, the phenolic OH-groups in the case of the substances obtained according to Examples 1 and 2 are mainly esterified with the phosphite residue.

EXAMPLE 4

8 g of sulphur chloride ($S_2Cl_2$) are added dropwise, while stirring at 20°, to 60 g of butylated 4-hydroxydiphenyl obtained according to Example c and dissolved in 150 g 1,2-dichloroethane; stirring for 2 hours at 60° is effected, 8 g of phosphorus trichloride are then added dropwise, stirring for 2 hours at 80° is effected, 20 g n-butanol and 10 g sodium carbonate are added and the material is kept for a further 2 hours at 80°. Washing with water is effected and the solvent is distilled off in a vacuum. 72 g of a highly viscous brownish oil remain; λmax: 263–269 nm (in alcohol).

EXAMPLE 5

To 400 g of butylated 4-Hydroxydiphenyl according to example e) which is dissolved in 300 g of 1,2- dichloroethane are added 4 g of dimethylformamide. Then 40 g of phosphorus trichloride is added within 20 minutes while stirring the reaction mixture. Nitrogen gas is bubbled through whilst the stirring is continued for 2 hours at a temperature of 80°C. HCl-gas is driven off. The temperature is then slowly risen to 150°–160°C, and the solvent together with HCl-gas distills off. When the HCl-formation has stopped, the reaction vessel is evacuated and the stirring continued for another two hours at 150°–160°C. on cooling a yellowish solid product results with a phosphorus content of 3,85%. The main fraction represents the formula:

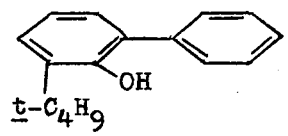

Although the present invention is described herein with particular reference to specific details, it is not intended that such details shall be regarded as limitations upon the scope of the invention except insofar as included in the accompanying claims.

I claim:

1. A mixture of compounds produced by reacting a first mixture of compounds of the formula

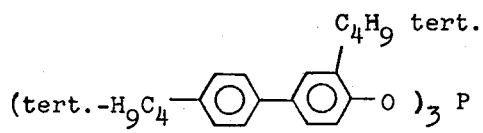

in which one X is a hydroxyl group and the other X is selected from hydrogen atoms and tertiary butyl radicals, each of $R_1$ and $R_2$ is independently selected from hydrogen atoms and tertiary butyl radicals, A is selected from phenyl radicals and phenyl radicals substituted by up to 2 tertiary butyl radicals, with the proviso that at least one of $R_1$ and $R_2$ must be a tertiary butyl radical and with the further proviso that at most 3 tertiary butyl radicals may be present per molecule, said first mixture being produced by reacting 2- or 4-hydroxydiphenyl with 1 to 3 mols of a tertiary butylating agent, with phosphorus trichloride and then reacting any chlorine atoms which may be left on the phosphorus atom with water or with a compound selected from the group consisting of alkanols of 1 to 18 carbon atoms, cyclohexanol, methylcyclohexanol, glycols of 2 to 6 carbon atoms, glycerine, pentaerithrytol, phenol, alkylphenol in which the alkyl group contains 1 to 18 carbon atoms, resorcinol, hydroquinone, 4,4'-dihydroxydiphenyl and 4,4'dihydroxydiphenyl propane.

2. A mixture of compounds according to claim 1 produced by reacting a mixture of compounds of the formula (I) with phosphorus trichloride in the presence of a Friedel-Crafts catalyst.

3. A mixture of compounds according to claim 1 wherein the tertiary butylating agent is iso-butylene, an iso- or tertiary-butylhalide or an iso- or tertiary-butyl alcohol.

4. A mixture of compounds according to claim 1, which results from a mixture of diphenyl derivatives of the formulae:

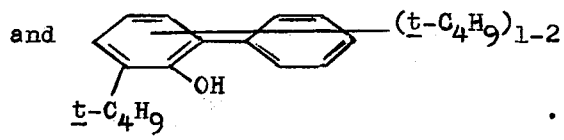

5. A mixture of compounds according to claim 1, which results from a mixture of diphenyl derivatives of the formulae:

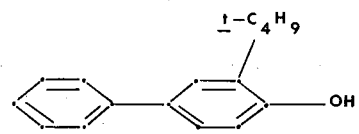

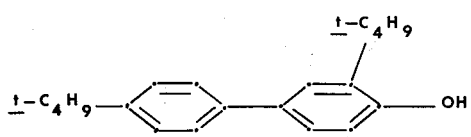

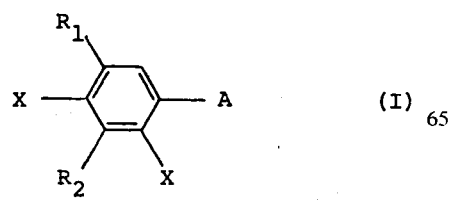 and 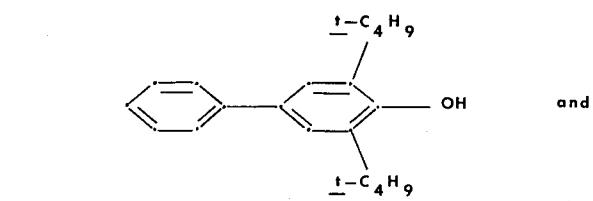

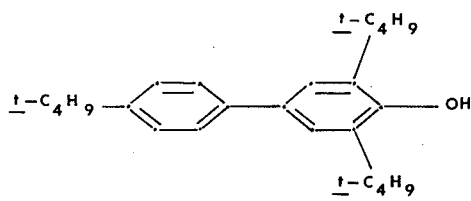

and a small amount of a compound of the formula

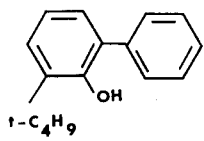

6. A phenol derivative according to claim 1, being tert.-butyl hydroxydiphenyl condensed with phosphorus trichloride.

7. A mixture of compounds according to claim 1 wherein the compounds of formula (I) are independently selected from compound of the formulae

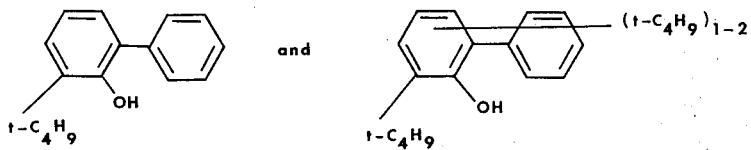

8. A mixture of compounds according to claim 1 wherein the compounds of formula (I) are independently selected from compounds of the formulae

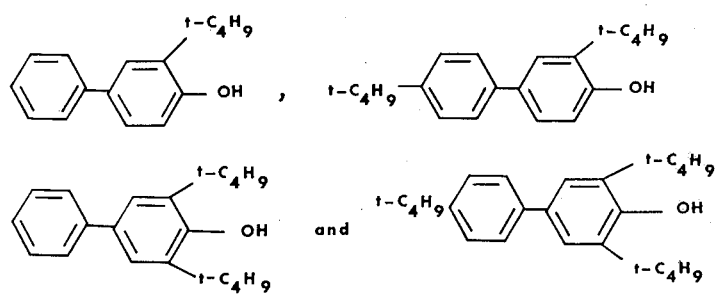

9. A compound according to claim 1 wherein the compounds of the formula I are selected from compounds of the formula 10. A process for the production of phenol derivatives, which comprises reacting a mixture of compounds of the formula

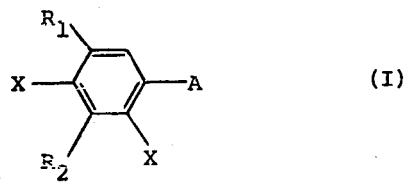

in which one X is a hydroxyl group and the other X is selected from hydrogen atoms and tertiary butyl radicals, each of $R_1$ and $R_2$ is independently selected from hydrogen atoms and tertiary butyl radicals, A is selected from phenyl radicals and phenyl radicals substituted by up to 2 tertiary butyl radicals, with the proviso that at least one of $R_1$ and $R_2$ must be a tertiary butyl radical and with the further proviso that at most 3 tertiary butyl radicals may be present per molecule, said mixture being produced by reacting 2- or 4-hydroxydiphenyl with 1 to 3 mols of a tertiary butylating agent, with phosphorus trichloride and then reacting any chlorine atoms which may be left on the phosphorus atom with water or with a compound selected from the group consisting of alkanols of 1 to 18 carbon atoms, cyclohexanol, methylcyclohexanol, glycols of 2 to 6 carbon atoms, glycerine, pentaerithrytol, phenol, alkylphenol in which the alkyl group contains 1 to 18 carbon atoms, resorcinol, hydroquinone, 4,4'-dihydroxydiphenyl and 4,4'-dihydroxydiphenyl propane.

* * * * *